March 23, 1937. C. V. DAME 2,074,462
DRAIN TRAP
Filed Dec. 9, 1935
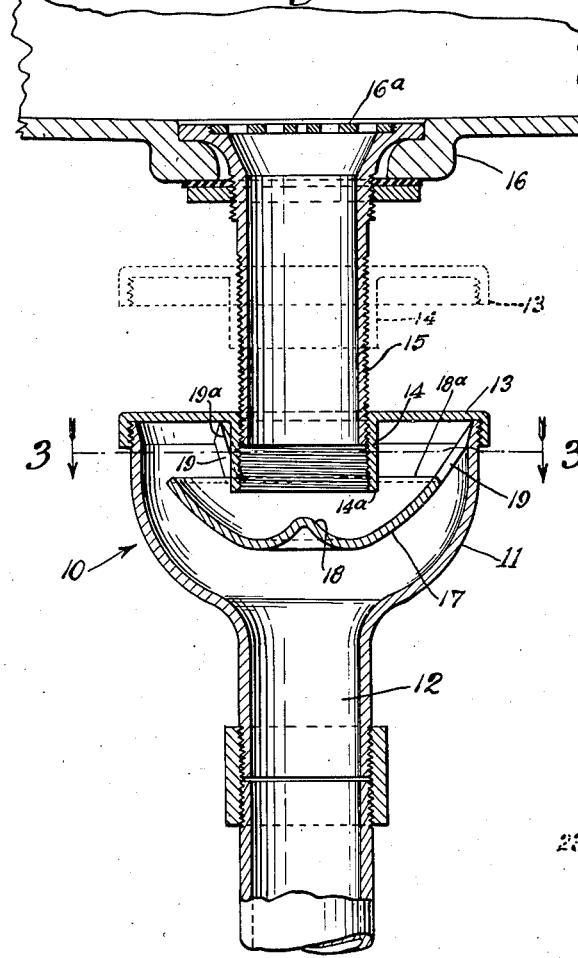
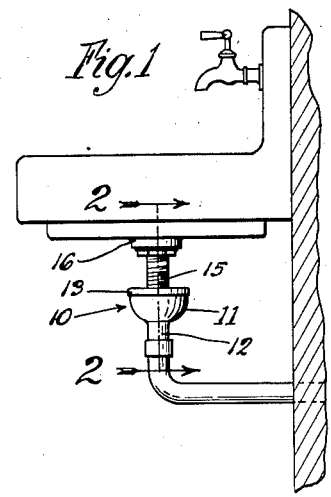
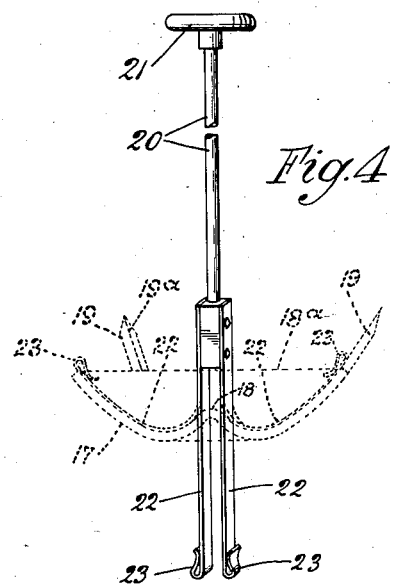
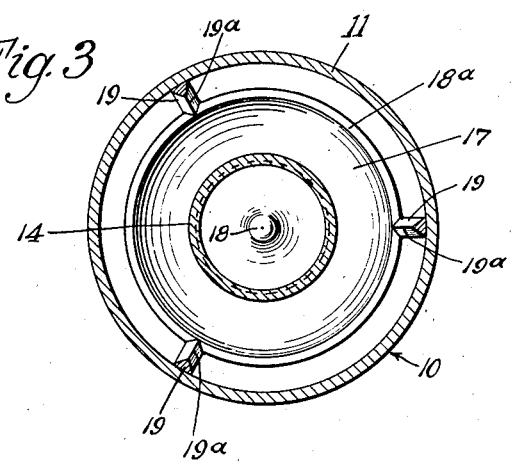
Inventor
Charles Vance Dame
by Maxwell F. Cargill
Attorney Patented Mar. 23, 1937

2,074,462

UNITED STATES PATENT OFFICE 2,074,462

DRAIN TRAP

Charles Vance Dame, Lanark, Ill.

Application December 9, 1935, Serial No. 53,507

1 Claim. (Cl. 182—7)

This invention relates to improvements in drain traps.

One object of the invention is to provide a drain trap which has practically no tendency to become clogged but which can readily be cleaned by means of a suitable tool passed downwardly through the inlet pipe.

Another object of the invention is to provide a trap comprising a covered casing having a basin therein which preferably is removable upon removing the cover.

A further object of the invention is to provide a trap comprising a casing having a basin therein which remains full of water to form a gas seal and which is so shaped and so spaced from the interior of the casing that in the event the water in the basin freezes, the casing will not be cracked or joints in the line opened.

Another object is to provide a tool for cleaning a trap of the type hereinafter more specifically described.

Other objects relate to various features of construction and arrangement of parts which will be apparent from a consideration of the following specification and accompanying drawing, wherein:

Figure 1 is an end elevation of a conventional sink showing an embodiment of my improved trap associated therewith.

Figure 2 is an enlarged broken sectional view taken on line 2—2 of Figure 1.

Figure 3 is a sectional view taken on line 3—3 of Figure 2.

Figure 4 is a perspective view of a tool for cleaning the trap.

In the drawing, 10 indicates generally the improved trap which comprises a casing 11 having an outlet 12 at the lower end, and a threaded cover 13 at the upper end. In the embodiment of the invention shown, the cover is formed with a depending annular flange 14 which is threaded on its interior to receive the lower end of the exteriorly threaded waste pipe 15 which carries waste water from the sink 16.

Positioned within the casing 11, concentrically with the intake member 14, is an overflow basin 17 which in the embodiment shown, is provided with the central conical shaped projection or prominence 18. The basin 17 which is generally of saucer shape with the side walls flared at such an angle as to preclude the possibility of cracking in the event water in the basin should freeze, is supported in the casing 17 in spaced relation with reference to the casing, and with the upper edge 18a thereof disposed at an elevation above the lower end 14a of the intake member 14. Means for supporting the basin are shown as comprising three arms 19 extending upwardly and outwardly from the edge 18a and seating at their upper ends against the upper edge of the casing. The arms thus position the basin concentrically of the intake 14 and support it against downward movement.

As the water flows from the sink 16 through the pipe 15 it enters the basin 17 and flows over the edge 18a of the same into the body of the bowl and thence downwardly through the outlet 12. Since the upper edge 18a is disposed above the lower edge 14a of the inlet member 14, the basin will retain sufficient water to seal the lower edge of the intake member against escape of gas upwardly through the trap.

When water rushes downwardly through the pipe 15 into the basin 17 the protuberance or prominence tends to direct the water radially in sheet form along the inner surface of the basin, thus flushing the same of accumulated matter and tending to keep it clean.

The arms 19 as shown in Figure 3 are of small cross sectional dimension and preferably shaped to provide an apex 19a along their upper surfaces to reduce the likelihood of waste matter lodging thereon or clinging thereto.

The pitch of the cooperating threads on the members 14 and 15 are such that as the cover 13 is turned in a direction to remove the same, no binding action will take place. The threads on the member 15 extend upwardly a distance sufficient to enable the cover to be elevated to approximately the position shown in dotted lines in Figure 2, whereupon the basin 17 may be removed from the casing 11 for the purpose of cleaning the basin or for the purpose of inserting a plumbing tool into the waste pipe below the trap should the latter become clogged.

Since the basin is spaced circumferentially from the casing, waste water can flow freely over the edge 18 and thus tends to prevent any localized accumulation of waste matter within the basin. However, should the matter accumulate in the basin which is not removable by the action of the water, the basin may readily be cleaned without removal from the casing as above described by means of a tool shown in Figure 4. This tool comprises a shank 20 having a handle 21 at its upper end and at its lower end two or more flexible arms or blades 22. These blades preferably are formed of "steel rule" material, that is, thin flexible steel of which steel rules are made. The lower ends of the arms 22 are shown as being provided with curved or looped ends 23.

To clean the basin 17 the strainer 16a of the sink can be removed and the tool passed downwardly through the waste pipe 15. Since the protuberance 18 is located concentrically with reference to the pipe 15, the arms 22 will be spread apart by the formation 18, and due to the flexibility of the arms will follow the curvature of the basin. Upon rotation of the tool by the handle 21, the blades will scrape off and loosen waste matter clinging to the basin. The curved ends 23 of the arms guide the free ends of the arms along the curved wall of the basin as will be seen.

While I have shown and described an embodiment of my improvements for the purpose of illustration, I do not wish to be restricted specifically thereto except as so limited by the appended claim.

I claim:

A drain trap comprising a casing having an inlet at the lower end and a removable cover at the upper end, said cover being provided with a depending inlet member, and an overflow basin in said casing into which said member extends, said basin having side walls so inclined as to preclude the possibility of cracking the basin upon the freezing of water therein.

CHARLES VANCE DAME.